May 3, 1966     M. L. POLANYI     3,249,105
DEVICES FOR MEASURING BLOOD PRESSURE
Filed April 19, 1963     3 Sheets-Sheet 1
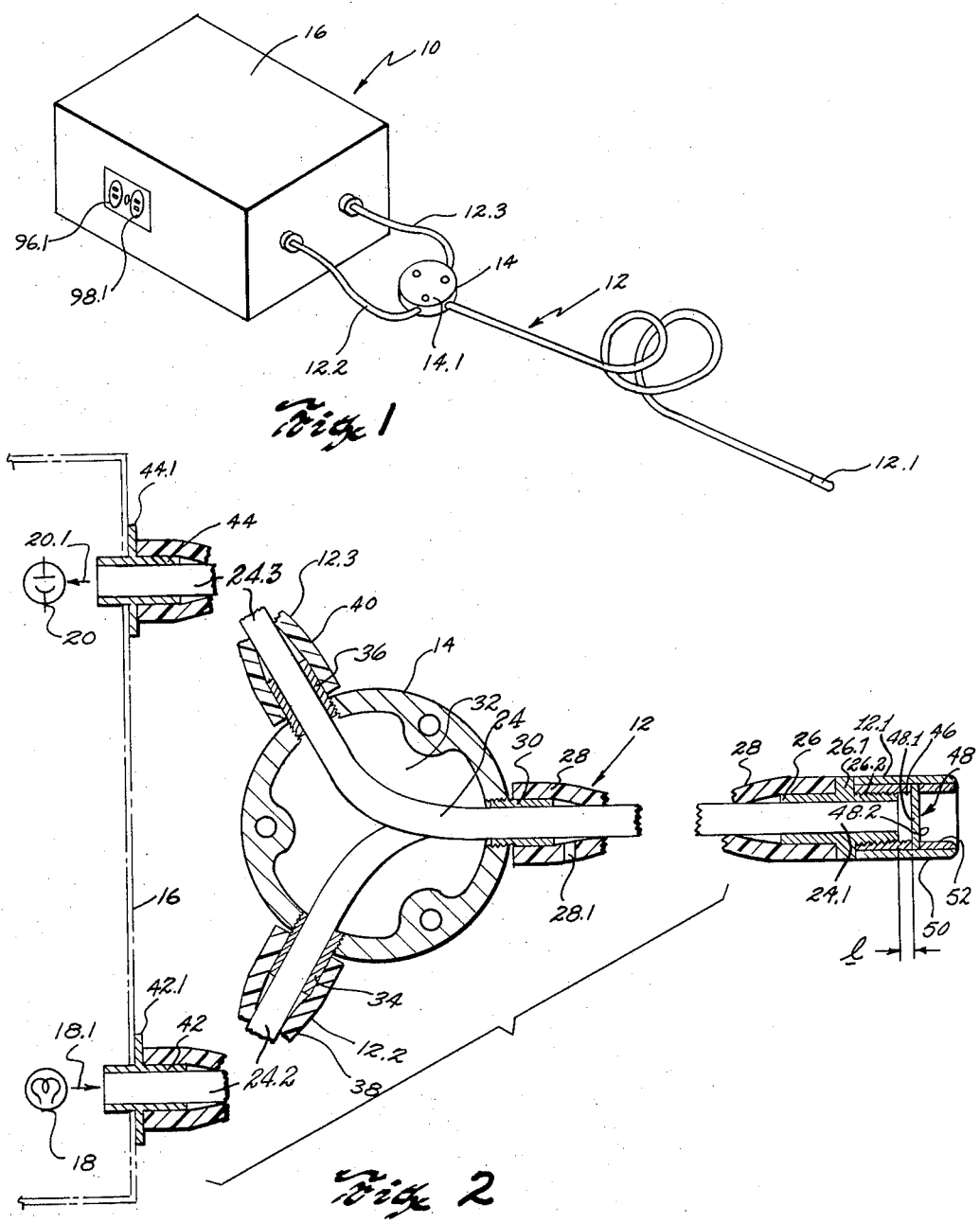
INVENTOR.
MICHAEL L. POLANYI
BY James P. McAndrews
ATTORNEY INVENTOR.
MICHAEL L. POLANYI
BY James P McAndrews
ATTORNEY

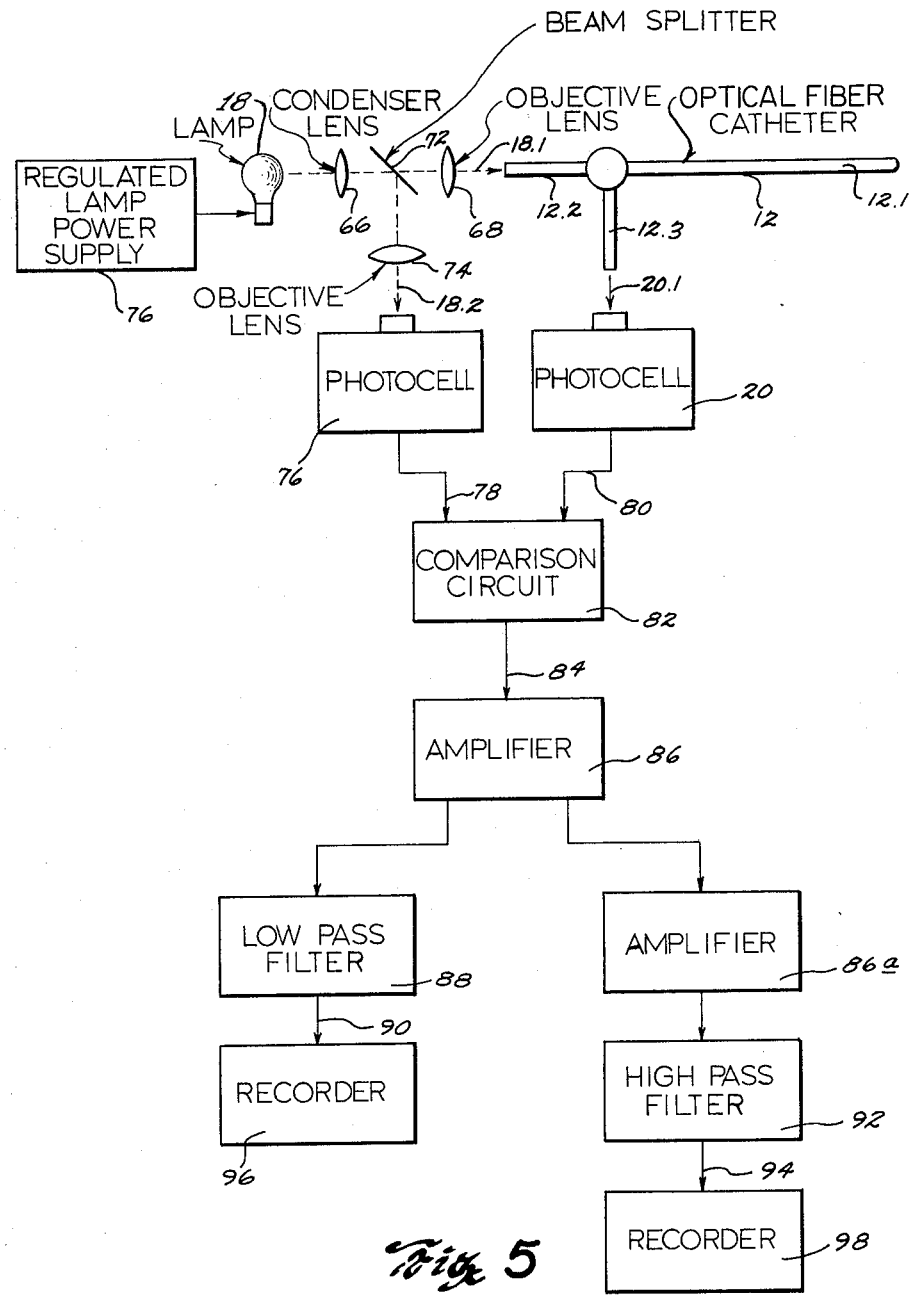

3,249,105
DEVICES FOR MEASURING BLOOD PRESSURE
Michael L. Polanyi, Webster, Mass., assignor to American Optical Company, Southbridge, Mass., a voluntary association of Massachusetts
Filed Apr. 19, 1963, Ser. No. 274,212
7 Claims. (Cl. 128—2.05)

The field of this invention is that of devices for determining blood pressure and the invention relates more particularly to a novel and improved pressure transducer apparatus which can provide precise determination of blood pressures at various locations within the cardiovascular system.

Present day diagnostic and surgical techniques relating to treatment of the heart and other circulatory system organs require detailed and accurate information as to blood pressures at various locations throughout the cardiovascular system. For example, it is frequently desirable to determine the frequency and amplitude of fluctuations of the blood pressure within an artery at selected locations immediately adjacent to the heart. Similarly, it is often advantageous to detect and monitor sounds relating to the mechanical functioning of organs of the cardiovascular system from a point as close as possible to the point of origin of such sounds.

One apparatus presently used for measuring blood pressure within the vascular system has comprised a manometer arranged in cooperative relation with a catheter. The catheter has been advanced through a passage in the vascular system for disposing the end of the catheter at the desired location within the system. A long hydrostatic column from the manometer has then been extended through the catheter and has been arranged to respond to fluid pressure existing in the system passage at the end of the catheter, thereby to provide a manometer reading corresponding to the fluid pressure. Unfortunately, the hydrostatic column required in the catheter has generally been on the order of 100 centimeters in length and this long column has had a severe damping effect on fluid pressures and on fluctuations of fluid pressures transmitted to the manometer. Other pressure transducer devices have also been employed in which a diaphragm has been disposed at the distal end of a catheter to be inserted within a vascular system passage and in which electrical means have been directly employed for detecting displacements of the diaphragm in response to fluid pressures in the system passage. Such conventional apparatus have been of substantially more complex and expensive construction.

It is an object of this invention to provide a novel and improved pressure transducer apparatus; to provide such an apparatus which can achieve precise determination of blood pressures at remote locations within the cardiovascular system; and to provide such an apparatus which can be of simple, rugged and inexpensive construction employed with convenience and efficiency. It is also an object of this invention to provide an improved pressure transducer apparatus which is particularly responsive to pressure fluctuations of relatively high frequency; to provide such a pressure transducer apparatus which can detect and monitor both sound and fluid pressures at remote locations within the cardiovascular system; and to provide such an apparatus which can furnish separate electrical signals precisely modulated in accordance with respective sound and fluid pressures detected at selected locations within the vascular system.

Briefly described, the pressure transducer apparatus provided by this invention comprises a catheter tube which is proportioned to be extended through a passage of a vascular system and which has a flexible membrane or diaphragm closing the distal end of the catheter, the membrane or diaphragm being exposed at one side to fluid pressures existing within the vascular system passage and at its opposite side to the interior of the catheter tube. The membrane or diaphragm is supported by the catheter means in such a manner that it can be displaced in response to fluctuations of fluid pressures in the system passage in accordance with the amplitude and frequency of said fluctuations.

In accordance with this invention, a light source, preferably an electric lamp having a carefully regulated direct current power supply, is located exteriorly of the vascular system and flexible light-conducting optical fiber means are arranged for conducting light from the source through the catheter tube and for directing this light onto said opposite side of the catheter membrane or diaphragm, whereby the light can be reflected from the diaphragm or membrane toward a first station within the catheter means in accordance with the extent to which the membrane or diaphragm has been displaced by said fluid pressures. Other light-conducting optical fiber means are arranged to receive and conduct reflected light from the first station through the catheter tube to a second station located exteriorly of the vascular system. Photoelectric means are then arranged to respond to the reflected light conducted to the second station for furnishing an electrical signal which is modulated in accordance with said fluid pressures.

As will be understood, the catheter membrane or diaphragm can be very rapidly and accurately responsive to fluid pressures and to both low and high frequency fluctuations of fluid pressures within a vascular system passage. Further, the light-conducting optical fiber means can transmit light to said photoelectric means for providing an electrical signal which is very accurately modulated in accordance with said fluid pressure fluctuations without any significant damping thereof. Accordingly, the electrical signal provided by the photoelectric means can include a high amplitude, low frequency component faithfully corresponding to blood pressure fluctuations caused by heart pump action and can also include a low amplitude, high frequency component faithfully corresponding to sound pressures originating in the vascular system near the apparatus diaphragm. In a preferred embodiment of this invention, the pressure transducer apparatus can include discriminating means responsive to the signal provided by said photoelectric means for furnishing separate electrical signals modulated in accordance with said sound and said fluid pressures respectively.

In a practical embodiment of this invention, second photoelectric means are arranged to be directly responsive to the light output of the apparatus light source for providing a reference signal corresponding to the intensity of the light source. The apparatus further includes comparison circuit means responsive to the reference signal and to the output signal of the photoelectric means first-named above for providing a resulting signal, the resulting signal corresponding to said fluid pressures and being independent of variations in output of the apparatus light source.

Other objects, advantages and details of the pressure transducer apparatus provided by this invention appear in the following detailed description of a preferred embodiment of the invention, the description referring to the drawings in which:

FIG. 1 is a perspective view of the basic apparatus provided by this invention;

FIG. 2 is a section view along the longitudinal axis of the catheter means embodied in the basic apparatus;

FIG. 5 is a schematic diagram illustrating the over-all apparatus provided by this invention.

Figure 3:
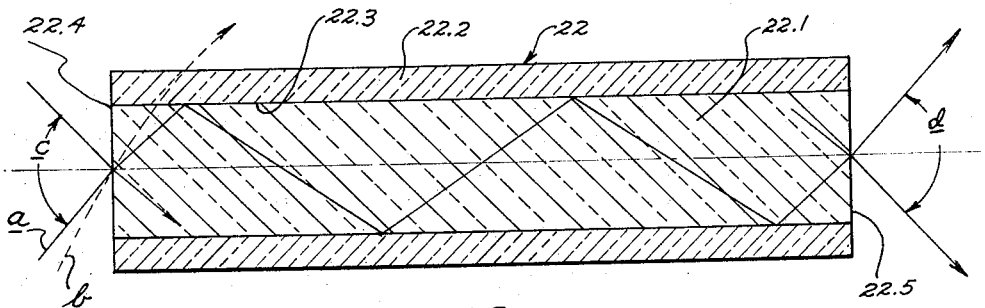
FIG. 3 is a section view along the longitudinal axis of a light-conducting optical fiber employed in the basic apparatus.

Referring to the drawings, 10 in FIG. 1 indicates the basic pressure transducer apparatus provided by this invention. As illustrated, the apparatus can include a catheter means 12 having a distal end 12.1 which can be inserted within and extended through a passage in a vascular system. The catheter can be divided into separate branches 12.2 and 12.3 at the junction device 14. The basic apparatus 10 can also include a housing 16 which can enclose a light source 18 and a photoelectric means 20. As is diagrammatically shown in FIG. 2, the light source 18 can be operatively associated with the catheter branch or arm 12.2 and the photoelectric means 20 can be operatively associated with the other catheter branch or arm 12.3.

In accordance with this invention, a plurality of flexible light-conducting optical fibers 22 (see FIG. 3) can be arranged within the catheter means 12 to form a fiber bundle 24 as shown in FIG. 2. The bundle fibers can be arranged in side-by-side relation at the bundle end 24.1 adjacent the distal end of the catheter means and the bundle fibers can be divided at the junction device 14 into separate branches or groups 24.2 and 24.3 corresponding to the catheter arms 12.2 and 12.3 respectively.

As shown in FIG. 3, each light-conducting optical fiber 22 can have a core part 22.1 of light-transmitting material of relatively high index of refraction and can have a cladding part 22.2 of light-transmitting material of relatively low index of refraction, thereby to form a light-reflecting interface 22.3 in accordance with the well-known principles of total internal reflection. A light ray $a$ entering such a fiber at one end 22.4 can be incident upon the fiber interface at an angle greater than the critical angle of reflection for the interface, whereby the light ray can be repeatedly reflected from the interface to be conducted through the fiber and to be emitted from the opposite end 22.5 of the fiber. Another light ray $b$ can enter the fiber to be incident upon the fiber interface at an angle less than the critical angle of reflection for the interface, whereby the ray $b$ can be transmitted through the interface to escape from the fiber. Of course, the difference in the refractive index of the core and cladding materials determines critical angle of reflection for the interface 22.3 and therefore also primarily determines the maximum angle $c$ at which light rays can be accepted within the fiber to be conducted through to the opposite end of the fiber. It should be noted that substantially all light rays conducted through the fiber can be emitted from the opposite end of the fiber in a cone of light having an apex angle $d$ corresponding to the maximum light acceptance angle $c$ of the fiber. Where the fibers are of small diameter relative to bends occurring in the fiber, the amount of light transmitted through the fiber can be substantially independent of the bends.

The fiber bundle 24 can be arranged as described within the catheter means 12 in various ways within the scope of this invention. In particular, this can be conveniently accomplished in the manner illustrated in FIG. 2. As shown, the end 24.1 of the fiber bundle can be secured within a collar 26 by means of a suitable adhesive such as an epoxy cement (not shown) and a protective sleeve 28 of plastic rubber or other flexible material or the like can be fitted over one end of the collar and abutted against the collar flange 26.1. The fiber bundle can be extended through the nipple 30 into the central recess 32 of the junction device 14 and can be divided within the recess into the separated bundle branches 24.2 and 24.3 previously described. These fiber bundle branches can be extended out of the recess 32 through respective nipples 34 and 36 and through respective flexible sleeves 38 and 40 or the like. The ends of the fiber bundle branches 24.2 and 24.3 can then be secured within respective flanged collars 42 and 44 by means of a suitable cement or the like. The flanges 42.1 and 44.1 of the branch collars can be secured to the housing 16 in any conventional manner for positioning the ends of the fiber bundle branches in desired relation to the light source 18 and photoelectric means 20 as is diagrammatically indicated in FIG. 2. As will be understood by reference to FIG. 2, the ends of the flexible tubes 28, 38, 40 and the like can be adhered to the appropriate nipples or collars for substantially sealing the optical fibers 22 within said catheter tubes. Preferably, the seal of the tube 28 can be relieved or vented adjacent the junction device 14 for preventing the entrapment of air within the tube 28. For example, an aperture 28.1 can be formed in the tube 28 adjacent the device 14. If desired, the recess 32 of the junction device 14 can be filled with a suitable potting material (not shown) for protecting the junction of the fiber bundle branches. A junction device cover 14.1 can be attached to the device with screw means or the like (see FIG. 1).

The collar 26 can be threaded at 26.2 and the end 24.1 of the fiber bundle can be ground flat and can be optically finished to be highly receptive to light. The opposite ends of bundle 24 at the end of the bundle arms 24.2 and 24.3 can also be ground flat and optically finished for the same reasons. In accordance with this invention, a sleeve 46 can be closed at one end with an elastic membrane or diaphragm 48 which is secured thereon with an epoxy cement or the like and the sleeve can be threadedly engaged on the collar 26 for disposing the diaphragm 48 in selected spaced relation to the end 24.1 of the fiber bundle. A spacing sleeve 50 can be preferably fitted over sleeve 46 and an additional sleeve 52 can be fitted within the sleeve 50 and abutted against the diaphragm 48. Preferably, the sleeves 46, 50 and 52 are secured and sealed in place with an epoxy cement or the like.

In the catheter construction thus far described, the protective sleeve 28 and the collars 26 and 46 cooperate to form a catheter tube. In this device, however, the diaphragm 48 closes the distal end 12.1 of the catheter tube. Further, as shown at 18.1 in FIG. 2, the light source 18 is adapted to receive and conduct light through the optical fibers in the fiber bundle arm 24.2 so that the light can be directed upon and reflected from the side 48.1 of the diaphragm. The optical fibers in the fiber bundle end 24.3 are adapted to receive this light reflected from the diaphragm and, as indicated at 20.1, are adapted to conduct said light to the photoelectric means 20. It should be understood that where it is said that the light is reflected from the diaphragm, this reflection can be specular or diffused as desired.

Where the basic apparatus 10 is adapted for determining blood pressures at selected locations within the cardiovascular system, the catheter 12 can be proportioned at its distal end 12.1 to be inserted within and extended along an artery or other vascular system passage in conventional manner. For these purposes, the catheter end 12.1 can have a diameter of approximately 0.060 inch and can have a length between its distal end and the junction device 14 of about 30 inches. The optical fibers 22 disposed in the catheter can be formed of glass, plastic or other light-transmitting materials and are preferably of very small diameter on the order of 50 microns in order to permit the grouping of about forty fibers in the bundle 24 while still permitting the catheter to achieve satisfactory flexibility. If desired light-conducting multifiber units can be substituted for the individual optical fiber 22 within the scope of this invention.

The diaphragm 48 is preferably formed of metal or other material of high elasticity and is preferably spaced at a very small distance $l$ on the order of 25 microns from the end 24.1 of the fiber bundle 24. Preferably, the diaphragm can be formed of a steel alloy selected to have a coefficient of thermoelasticity of nearly zero within the range of temperatures likely to be encountered in the cardiovascular system. In a practical embodiment, the diaphragm 48 can have a thickness on the order of 0.0003 inch and a diameter of approximately 0.040 inch and can have a resonant frequency on the order of 1500 c.p.s. Most advantageously, the side 48.1 of the diaphragm exposed to the interior 54 (see FIG. 2) of the catheter can be polished or otherwise treated for providing a specular surface thereon.

Figure 4:
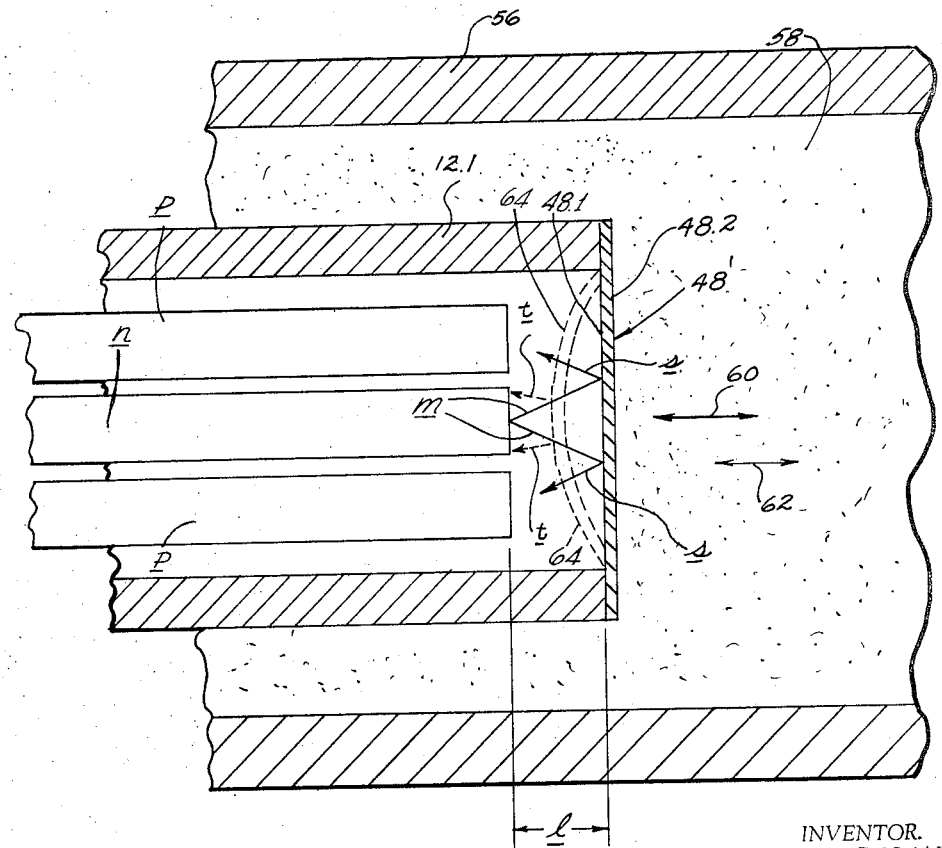
FIG. 4 is a diagrammatic section view illustrating functioning of the basic apparatus.

In this arrangement, the distal end 12.1 of the catheter can be inserted within an artery or other passage such as is diagrammatically indicated at 46 in FIG. 4, thereby to expose one side 48.2 of the apparatus diaphragm 48 to the pressures exerted thereon by blood or other fluid 58 within the passage. The fluid pressures exerted on the diaphragm can include low frequency, high amplitude fluid pressure fluctuations within the system passage such as might be caused by heart pumping action within the system, such a low frequency pressure being indicated in FIG. 4 by the arrow 60. The pressures exerted on the diaphragm 48 can also include relatively higher frequency, low amplitude pressures such as might be caused by sounds relating to mechanical functioning of circulatory system organs or the like immediately adjacent to the apparatus diaphragm within the vascular system, such higher frequency sound pressures being indicated in FIG. 4 by the arrow 62. It should be understood, that although the pressures indicated by arrows 60 and 62 are similar, the term fluid pressure as used herein shall be considered, wherever appropriate, to refer to vascular system pressures due to heart pumping action or the like having a frequency of less than approximately 60 c.p.s. and the term sound pressure shall be considered to refer to pressure of relatively higher frequencies above approximately 60 c.p.s. When sound and fluid pressures 60 and 62 are exerted on the diaphragm 48, the diaphragm can be flexed from the position shown in solid lines in FIG. 4 to the position of displacement indicated, for example, by the broken lines 64. As the tube 28 has preferably been relieved or vented at 28.1, the fluid pressure exerted on the side 48.1 of the diaphragm can equal atmospheric pressure. Accordingly, the diaphragm can be rapidly and faithfully responsive to each of these sound and fluid pressures exerted on the side 48.2 so that the extent of the displacement of the diaphragm can correspond to the difference in amplitude between the sound and fluid pressures and atmospheric pressures and so that the frequency of the flexing of the diaphragm can correspond to the frequency of fluctuations of said sound and fluid pressures.

It can be seen by reference to FIGS. 2 and 4, that the end 24.1 of the fiber bundle is fixed within the catheter means and is fixedly spaced from the diaphragm 48 at a spacing *l*. Accordingly, as the diaphragm 48 is flexed or displaced in response to fluctuations in the sound and fluid pressures exerted on the side 48.2 of the diaphragm, the diaphragm moves inwardly toward and outwardly away from the end of the fiber bundle. Referring to FIG. 4, it can be seen that a cone of light represented by the light rays *m* can be emitted from the light-conducting fiber *n* and can be directed upon the diaphragm 48, the fiber *n* being representative of the optical fibers 22 in the branch 24.2 of the fiber bundle 24. When the diaphragm 48 occupies the position indicated in solid lines in FIG. 4, these light rays can be reflected from the diaphragm toward a first station occupied by the ends of the fibers *p* as indicated in FIG. 4 by the reflected light rays *s*, the fibers *p* being representative of the optical fibers 22 in the fiber bundle 24.3. However, when the diaphragm 48 has been displaced in response to sound and fluid pressures to the position shown by the broken lines 64, the same light rays *m* emitted from the fiber *n* can be reflected back into the fiber *n* as indicated in FIG. 4 by the reflected light rays *t*. The light rays described can be diffusely reflected from the diaphragm if desired but preferably are specularly reflected therefrom in accordance with this invention. Accordingly, it can be seen that the light received at the first station occupied by ends of the fiber corresponds to the displacement of the diaphragm 48 and therefore the light which is conducted to a second station occupied by the photoelectric means 20 at the opposite ends of the fiber also corresponds to the diaphragm displacement. It will be understood that the photoelectric means 20 can be responsive to the reflected light conducted to said second station for providing an electrical signal which is accurately modulated in accordance with the displacements of diaphragm 48 and which therefore is accurately modulated in accordance with said sound and fluid pressures 60 and 62.

In the overall pressure transducer apparatus of this invention, as is schematically illustrated in FIG. 5, the light source 18 can comprise an electric lamp and can be associated with condenser lens means 66 and objective lens means 68 for directing a substantial part 18.1 of the light output of the source into the optical fibers of the fiber bundle branch 24.2 within the catheter arm 12.2. Preferably, the light source is provided with a regulated direct current power supply 70 so that the intensity of the light output of the source, and therefore the intensity of the proportional part 18.1 of that light output directed into the catheter arm 12.2, can remain substantially constant. The power supply and lens means associated with the light source 18 can be conventional and will not be further described herein.

In a preferred embodiment of this invention, a conventional beam splitter such as a partially-transmitting partially-reflecting mirror 72 can be arranged in conjunction with objective lens means 74 and with the previously described condenser lens means 66 so that a second proportional part 18.2 of the light output of the light source can be directed into a photoelectric means 76. The operation of the beam splitter and the photoelectric means 76 can be conventional so that it will be sufficient description herein to state that the photoelectric means 76 is adapted for providing a reference electrical signal 78 which is modulated in accordance with the intensity of the light output of the light source 18.

As has been previously described, photoelectric means 20 can be arranged in operative relation to the catheter arm 12.3 for receiving light 20.1 which is modulated in accordance with sound and fluid pressures within a vascular system. The photoelectric means can function in conventional manner for providing an electrical signal indicated at 80 in FIG. 5, corresponding to said sound and fluid pressures.

The reference signal 78 and the pressures modulated signal 80 can be compared in conventional comparison circuit means indicated schematically at 82 for providing a resulting signal 84 which is accurately modulated in accordance with said sound and fluid pressures and which is independent of any inadvertent variations in the intensity of the output of the light source 18.

The resulting signal 84 can be amplified as indicated at 86 in FIG. 5 and preferably, discriminating means are arranged for separating the low and high frequency components of the resulting signal. For example, as is schematically illustrated in FIG. 5, conventional low pass filter means 88 can be arranged to pass the component of the amplified signal 84 having a frequency lower than approximately 60 c.p.s., thereby to provide a separate signal 90 which can be modulated in accordance with fluid pressures within a vascular system. Corresponding high pass filter means 92 arranged in parallel with the low pass filter means 88 can pass the relatively higher frequency component of the amplified signal 84, thereby to provide a separate signal 94 which can be modulated in accordance with sound pressures within a vascular system. Where sound pressures are to be separated for providing the separate signal 94, the signal 84 can preferably be subjected to more than one stage amplification as indicated at 86a in FIG. 5.

As indicated in FIG. 5, recording or display devices 96 and 98 of any conventional type can be arranged for receiving the separate signals 90 and 94. Of course, any conventional tape or stylus recording devices or the like and any conventional display devices such as oscilloscope or loud speaker devices can be arranged for receiving the signals 90 and 94. Conventional outlet means 96.1 and 98.1 are indicated on the basic housing 10 in FIG. 1 and it will be understood that any conventional recording and display devices can be arranged for receiving the separate signals 90 and 94 as desired.

It should be understood that pressure transducer apparatus described herein has been described by way of illustration and that many modifications and equivalents thereof falling within the scope of the appended claims could also be employed within the scope of this invention.

I claim:

1. A remote pressure transducer apparatus comprising a light-reflecting diaphragm, means supporting the diaphragm for exposing only one side thereof to a fluid pressure, said supporting means permitting displacement of the diaphragm on the supporting means in response to said pressure, said diaphragm having a selected elasticity such that said diaphragm can be displaced by said pressure to an extent which is proportional to said pressure, a light source located remotely from said diaphragm, light-conducting optical fiber means conducting light from said source and directing said light onto the opposite side of the diaphragm for reflecting a proportional part of said light therefrom toward a first station in accordance with said displacement of the diaphragm, light-conducting optical fiber means conducting said reflected light from said first station to a second station located remotely from said diaphragm, and photoelectric means responsive to said reflected light conducted to said second station for providing an electrical signal corresponding to said fluid pressure.

2. Apparatus for transducing fluid pressure within a cardiovascular system, said apparatus comprising a flexible catheter tube having a distal end adapted to extend into a passage of the cardiovascular system, an elastic diaphragm closing the distal end of the catheter tube, said diaphragm being exposed at one side to fluid pressure within said passage and at its opposite side to the interior of the catheter tube, said diaphragm having a specular surface on said opposite side and having a selected elasticity such that the diaphragm is adapted to be displaced inwardly of the catheter tube in response to said fluid pressure to an extent which is proportional to said pressure, a light source located exteriorly of the cardiovascular system, flexible light-conducting optical fiber means extending from said source through said catheter tube and being secured at one end within the tube with said one end in spaced relation to said specular diaphragm surface, said fiber means conducting light from said source and directing said light upon said specular diaphragm surface to be reflected therefrom toward a first station within the catheter tube in accordance with the extent to which the diaphragm has been displaced by said fluid pressure, other flexible light-conducting optical fiber means fixed at one end at said first station within said catheter tube for receiving and conducting said reflected light from said first station to a second station located exteriorly of the cardiovascular system, and photoelectric means responsive to light conducted to said second station for providing an electrical signal corresponding to said fluid pressure.

3. Apparatus for transducing sound and fluid pressures within a cardiovascular system, said apparatus comprising a flexible catheter tube having a distal end adapted to extend into a passage of the cardiovascular system, an elastic diaphragm closing the distal end of the catheter tube, said diaphragm being exposed at one side to sound and fluid pressures within said passage and at its opposite side to the interior of the catheter tube and being adapted to be displaced inwardly and outwardly of the catheter tube in response to fluctuations of said sound and fluid pressures, a light source located exteriorly of the cardiovascular system, flexible light-conducting optical fiber means conducting light from said source through the catheter tube and directing said light upon said opposite side of the diaphragm to be reflected therefrom toward a first station within the catheter tube in accordance with the extent to which the diaphragm has been displaced by said sound and fluid pressures, other flexible light-conducting optical fiber means conducting said reflected light from said first station to a second station located exteriorly of the cardiovascular system, photoelectric means responsive to light conducted to said second station for providing an electrical signal which is modulated in accordance with the fluctuations of said sound and fluid pressures, and discriminating means responsive to said signal providing separate signals modulated in accordance with fluctuations of said sound and said fluid pressures respectively.

4. Apparatus for transducing sound and fluid pressures within a cardiovascular system, said apparatus comprising a flexible catheter tube having a distal end adapted to extend into a passage of the cardiovascular system, an elastic diaphragm closing the distal end of the catheter tube, said diaphragm being exposed at one side to sound and fluid pressures within said passage and at its opposite side of the interior of the catheter tube and being adapted to be displaced inwardly and outwardly of the catheter tube in response to fluctuations of said sound and fluid pressures, a light source located exteriorly of the cardiovascular system, flexible light-conducting optical fiber means conducting light from said source through the catheter tube and directing said light upon said opposite side of the diaphragm to be reflected therefrom toward a first station within the catheter tube in accordance with the extent to which the diaphragm has been displaced by said sound and fluid pressures, other flexible light-conducting optical fiber means conducting said reflected light from said first station to a second station located exteriorly of the cardiovascular system, photoelectric means responsive to light conducted to said second station for providing an electrical signal which is modulated in accordance with the fluctuations of said sound and fluid pressures, low pass filter means transmitting the relatively low frequency component of said signal corresponding to fluctuations of said pressure, high pass filter means in parallel with said low pass filter means transmitting the relatively high frequency component of said signal corresponding to said sound pressure fluctuations, and display means actuated by the components of said signal transmitted by respective filter means for indicating said sound and fluid pressures respectively.

5. Apparatus for transducing sound and fluid pressures within a cardiovascular system, said apparatus comprising a flexible catheter tube having a distal end adapted to extend into a passage of the cardiovascular system, an elastic diaphragm closing the distal end of the catheter tube, said diaphragm being exposed at one side to sound and fluid pressures within said passage and at its opposite side to the interior of the catheter tube and being adapted to be displaced inwardly and outwardly of the catheter tube in response to fluctuations of said sound and fluid pressures, an electric lamp located exteriorly of the cardiovascular system, a regulated source of D.C. power for said lamp, flexible light-conducting optical fiber means conducting light from said source through the catheter tube and directing said light upon said opposite side of the diaphragm to be reflected therefrom toward a first station within the catheter tube in accordance with the extent to which the diaphragm has been displaced by said sound and fluid pressures, other flexible light-conducting optical fiber means conducting said reflected light from said first station to a second station located exteriorly of the cardiovascular system, photoelectric means responsive to light conducted to said second station for providing an electrical signal which is modulated in accordance with the fluctuations of said sound and fluid pressures, means amplifying said signal, discriminating means responsive to said signal for providing separate signals modulated in accordance with fluctuations of said sound and said fluid pressures respectively, and display means actuated by respective separate signals for indicating said sound and fluid pressures respectively.

6. Apparatus for transducing sound and fluid pressures within a cardiovascular system, said apparatus comprising a flexible catheter tube having a distal end adapted to extend into a passage of the cardiovascular system, an elastic diaphragm closing the distal end of the catheter tube, said diaphragm being exposed at one side to sound and fluid pressures within said passage and at its opposite side to the interior of the catheter tube and being adapted to be displaced inwardly and outwardly of the catheter tube in response to fluctuations of said sound and fluid pressures, a source of light located exteriorly of the cardiovascular system, flexible light-conducting optical fiber means receiving and conducting a first proportional part of the light from said source through the catheter tube and directing said light upon said opposite side of the diaphragm to be reflected therefrom toward a first station within the catheter tube in accordance with the extent to which the diaphragm has been displaced by said sound and fluid pressures, other flexible light-conducting optical fiber means conducting said reflected light from said first station to a second station located exteriorly of the cardiovascular system, photoelectric means responsive to light conducted to said second station for providing a first electrical signal which is modulated in accordance with the fluctuations of said sound and fluid pressures, means directing a second proportional part of said light from said source to a subsidiary station, second photoelectric means responsive to light received at said subsidiary station for providing a reference signal, comparison circuit means receiving said first and reference signals for providing a resulting signal which is independent of the intensity of said light source, and discriminating means responsive to said resulting signal for providing separate signals modulated in accordance with fluctuations of said sound and said fluid pressures respectively.

7. A pressure transducer apparatus comprising a light-reflecting diaphragm, means supporting the diaphragm for exposing one side thereof to a fluid pressure and for permitting displacement of the diaphragm on said supporting means in response to said pressure to an extent which is proportional to said pressure, means directing light onto the opposite side of said diaphragm for reflecting a proportional part of said light toward a selected station in accordance with said displacement of the diaphragm, light-conducting optical fiber means conducting said reflected light from said station to a second station located remotely from said diaphragm, and means responsive to said reflected light conducted to said second station for providing a signal corresponding to said pressure.

References Cited by the Examiner

UNITED STATES PATENTS

| | | | |
|---|---|---|---|
| 2,825,260 | 3/1958 | O'Brien | 128—6 X |
| 2,959,056 | 11/1960 | Traite | 128—2.05 X |
| 3,040,737 | 6/1962 | Kompelien et al. | 128—2.05 |
| 3,068,739 | 12/1962 | Hicks | 128—6 X |
| 3,091,235 | 5/1963 | Richards | 128—6 |
| 3,099,262 | 7/1963 | Bigliano | 128—2.05 |

RICHARD A. GAUDET, *Primary Examiner.*

LOUIS R. PRINCE, *Examiner.*

SIMON BRODER, *Assistant Examiner.*